(12) United States Patent
Lee

(10) Patent No.: US 10,352,371 B2
(45) Date of Patent: Jul. 16, 2019

(54) PROTECTIVE CLUTCH ASSEMBLY FOR TOYS AND METHOD OF MAKING THE SAME

(71) Applicant: New Bright Industrial Co., Ltd., Hong Kong (HK)

(72) Inventor: Keung Lee, Hong Kong (HK)

(73) Assignee: New Bright Industrial Co., Ltd., Kowloon (HK)

( * ) Notice: Subject to any disclaimer, the term of this patent is extended or adjusted under 35 U.S.C. 154(b) by 111 days.

(21) Appl. No.: 15/465,089

(22) Filed: Mar. 21, 2017

(65) Prior Publication Data

US 2018/0274598 A1  Sep. 27, 2018

(51) Int. Cl.
F16D 7/04 (2006.01)

(52) U.S. Cl.
CPC ............... *F16D 7/044* (2013.01); *F16D 7/04* (2013.01); *F16D 7/042* (2013.01); *F16D 2200/0056* (2013.01); *F16D 2250/0007* (2013.01); *F16D 2250/0084* (2013.01)

(58) Field of Classification Search
CPC ... F16D 7/00; F16D 7/04; F16D 7/042; F16D 7/044; F16D 43/202; F16D 43/2022; F16D 43/2024
See application file for complete search history.

(56) References Cited

U.S. PATENT DOCUMENTS

| | | | |
|---|---|---|---|
| 1,126,219 A * | 1/1915 | Hupp | F16D 7/044 464/38 |
| 3,068,667 A * | 12/1962 | Sussman | F16D 7/044 464/23 |
| 3,735,526 A | 5/1973 | Ensmann et al. | |
| 4,135,328 A | 1/1979 | Yamasaki | |
| 5,524,870 A * | 6/1996 | Tallent | B66D 1/58 254/323 |
| 7,455,123 B2 * | 11/2008 | Aeberhard | B25B 23/141 173/176 |
| 8,267,234 B2 * | 9/2012 | Koop | F16D 7/044 192/55.2 |
| 2005/0133330 A1 * | 6/2005 | Stiefvater | F16D 7/044 192/55.1 |
| 2006/0118380 A1 * | 6/2006 | Aeberhard | B25B 23/141 192/56.61 |
| 2008/0015034 A1 * | 1/2008 | Downey | A01D 69/08 464/39 |
| 2008/0153606 A1 * | 6/2008 | Koop | F16D 7/044 464/83 |

* cited by examiner

*Primary Examiner* — David R Morris
(74) *Attorney, Agent, or Firm* — Niixon & Vanderhye, P.C.

(57) ABSTRACT

A clutch assembly for a toy includes a clutch disc member and an inserting member. The clutch disc member includes a central opening and a plurality of seats distributed in a circular pattern. The inserting member includes a plurality of wedges distributed in a circular pattern. The seats and the wedges are designed to (A) engage the wedges in the seats when a force exerted between a driving element operably connected to the clutch disc member and a driven element operably connected to the inserting member is less than a predetermined force level, and (B) automatically disengage the wedges from the seats when the force exerted exceeds the predetermined force level, and (C) re-engage again when the excessive force is released so as to fall below the predetermined force level after slippage of the wedges out of the seats.

11 Claims, 16 Drawing Sheets

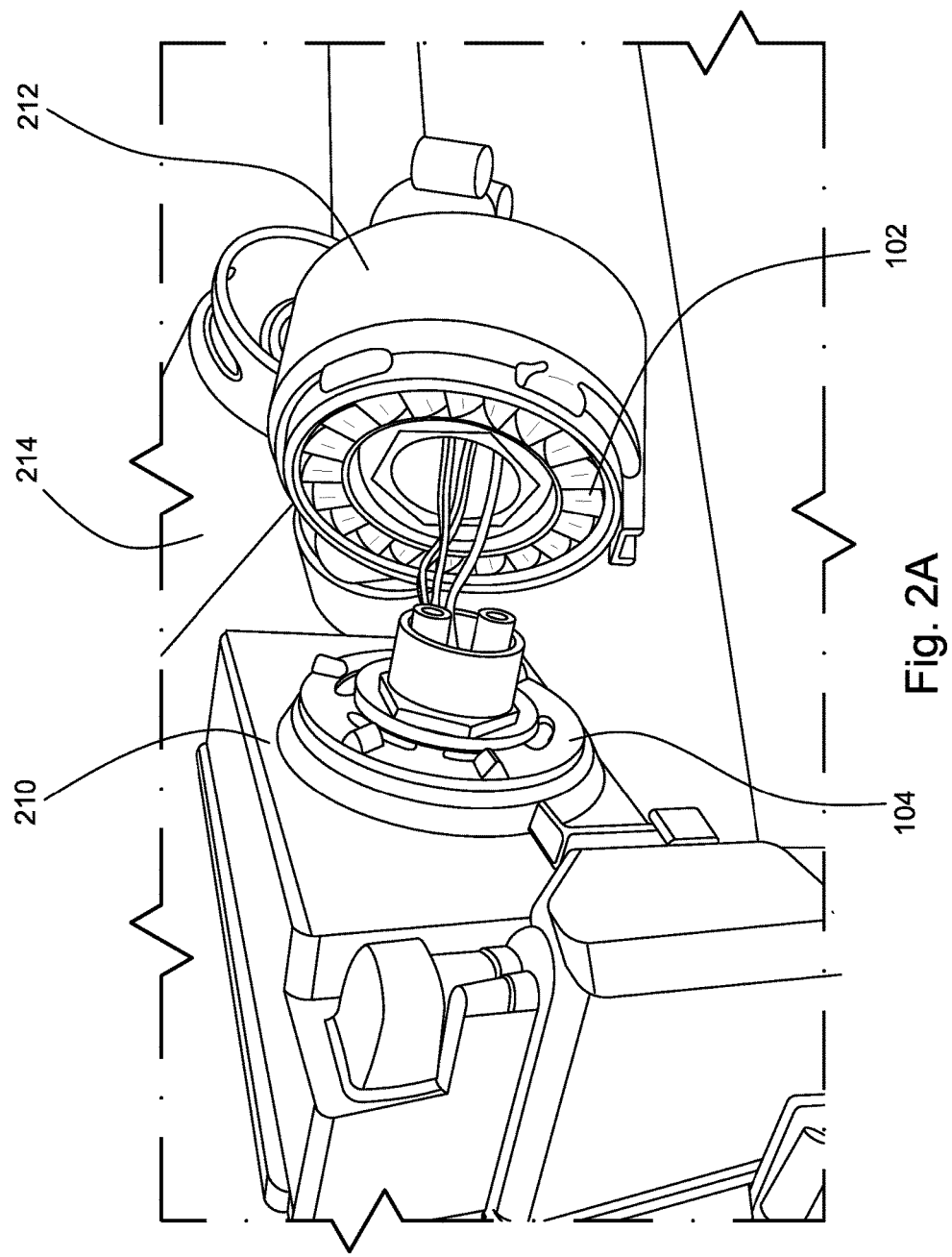

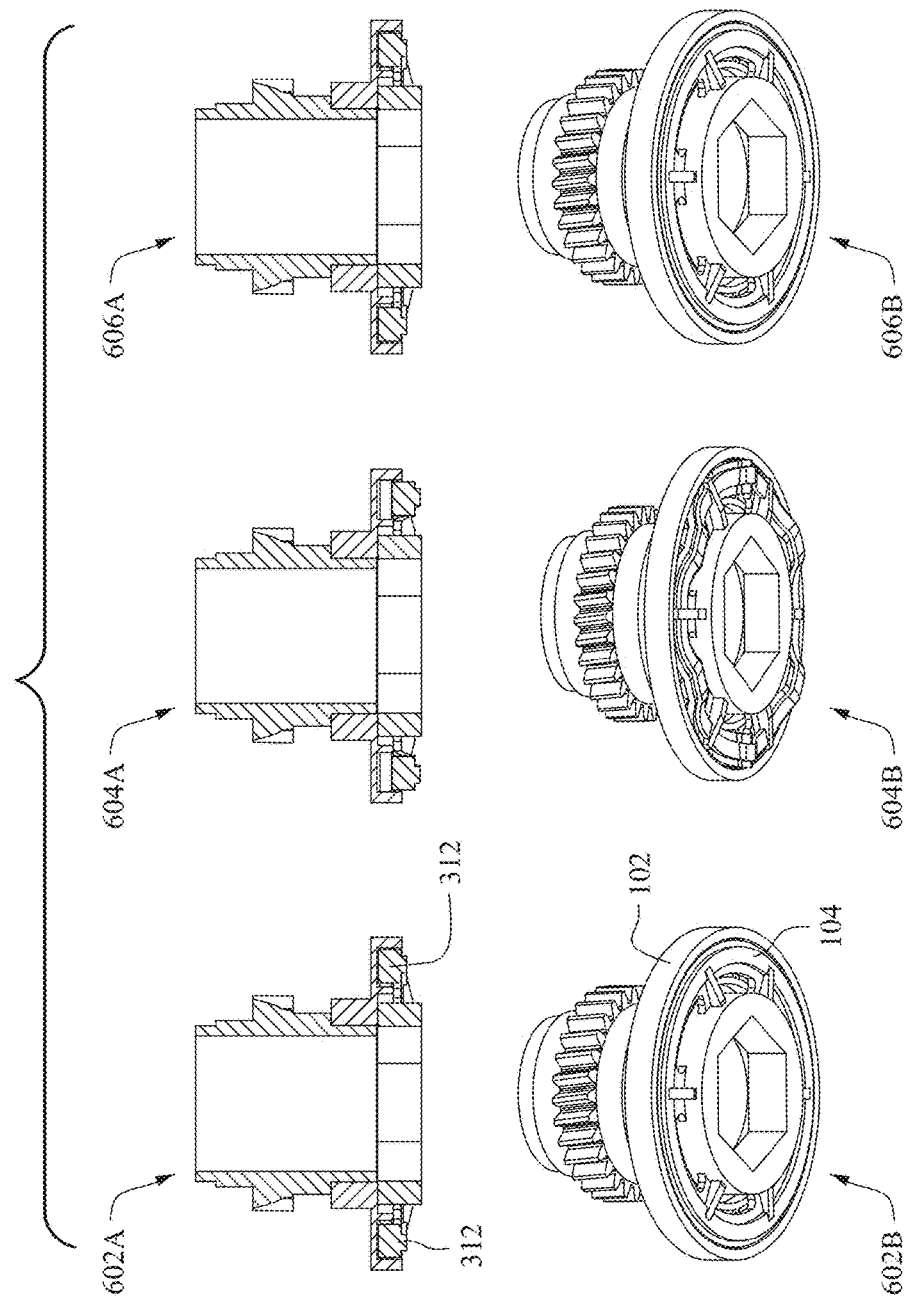

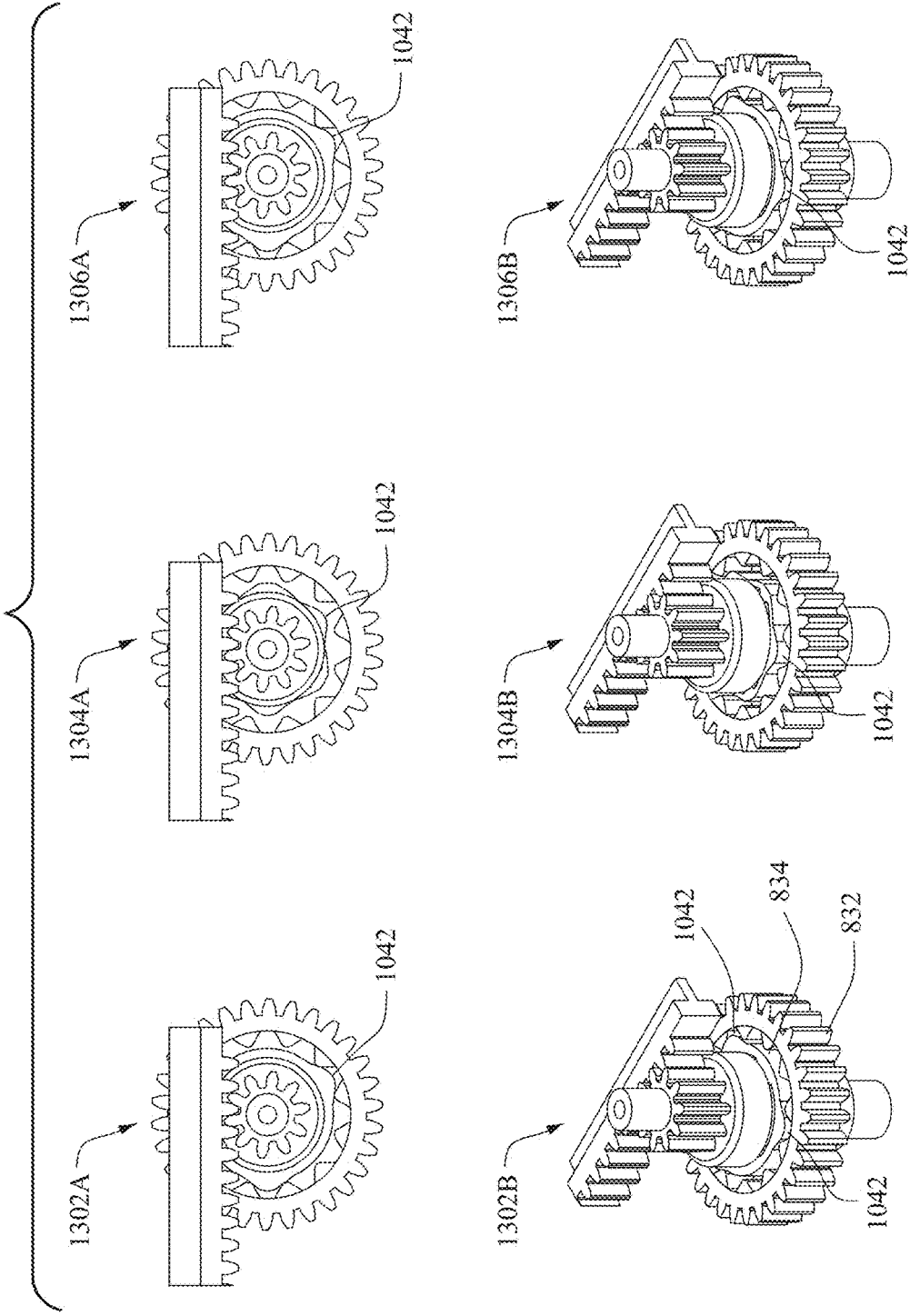

PROTECTIVE CLUTCH ASSEMBLY FOR TOYS AND METHOD OF MAKING THE SAME

TECHNICAL FIELD

Certain exemplary embodiments described herein relate generally to the protection of internal components in toys including, for example, motorized toys. More particularly, certain exemplary embodiments relate to an improved design and assembly method for a clutch assembly that protects such toy components subjected to excessive force.

BACKGROUND AND SUMMARY

Mechanical toys commonly have wheels, gearboxes for controlling a grip or for lifting/rotating an arm of the toy, etc., which are motor-driven. In most such toys, an actuator, such as a DC motor or the like, is connected to the driven component (e.g., a wheel of the vehicle, a robotic arm etc.) by an intermediate clutch assembly. The clutch assembly, in these arrangements, is primarily used to provide force to the driven component by engaging the clutch device in order to transmit the rotational force of the motor to the driven component. However, in some instances, it may also be desired that the clutch assembly additionally protects against damaging internal components of the toy when subjected to excessive force, such as preventing the motor being burnt out when the motor is prevented from turning, or damaging lifting/rotating mechanisms because of excessive force.

Conventional clutches for toys include and use springs or coils, and the rotation force required for the driven component is caused by a compression of the spring and/or coil. More specifically, the compressed spring causes the two members of the clutch to engage, and thus deliver the motor's rotation force to the driven element. When the rotation is prevented, however, the spring or coil relaxes and the two members of the clutch become disengaged—thereby reducing the amount of damage to internal components of the toy For example, U.S. Pat. No. 3,735,526 issued to Ensmann et al. on May 29, 1973, describes a conventional clutch assembly for a winding spring-driven toy. A clutch assembly is described in which a driven clutch member of a toy spring drive is positively engaged, with teeth for vertically retaining, by a driving clutch member of a wind-up mechanism. The arrangement is alleged to provide a quickly engageable and releasable spring wind-up connection for toy vehicle games and toy vehicle launchers.

Another U.S. Pat. No. 4,135,328, issued to Yamasaki on Jan. 23, 1979, describes a conventional clutch for a toy vehicle or the like having an inertia motor energized by a spring-return drawstring mechanism. A drive spool receiving the drawstring has a drive disc portion with an integral square shank loosely encircled by a clutch disc with a circumferentially disposed slot engaged by an arcuate projection on the surface of the drive disc, the projection being shorter in length to allow relative motion between the discs.

Conventional clutches for toys, which rely upon springs and/or coils, may suffer from issues related to wear-and-tear, reduction of elastic recovery, lessening of reliable operation etc., over time. Therefore, new and improved clutch mechanisms for toys that have reduced reliance, or no reliance, on the conventional spring and/or coils are desirable.

BRIEF DESCRIPTION OF THE DRAWINGS

Certain features, aspects and advantages of the embodiments described herein will be better understood from the following detailed description, including the appended drawings, in which:

FIG. 6 illustrates the coupling and decoupling in the wedge friction clutch according to come example embodiments;

FIG. 13 illustrates the coupling and decoupling in the radial wedge clutch according to come example embodiments;

DETAILED DESCRIPTION OF CERTAIN EXEMPLARY EMBODIMENTS

Figure 1:
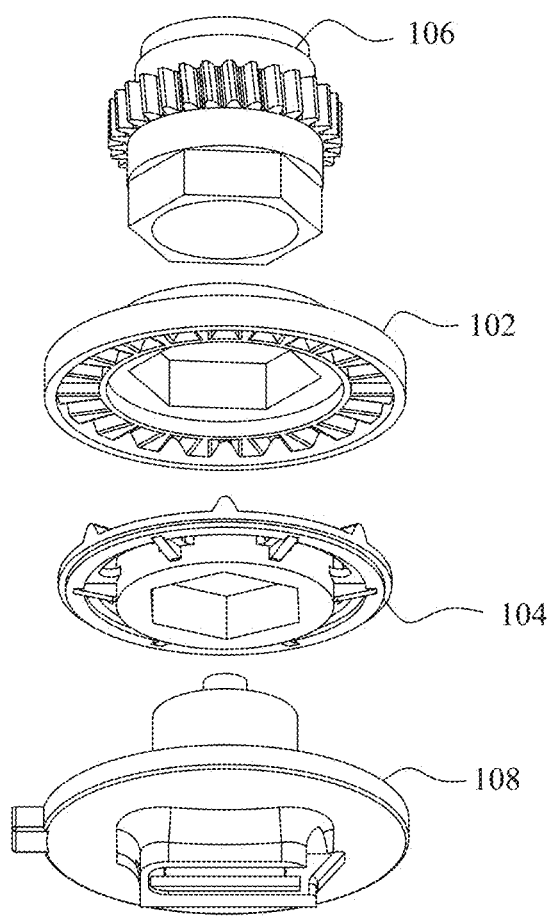
FIG. 1 is a partly exploded view of a wedge friction clutch assembly according to some example embodiments.

In example embodiments, the present invention involves a friction clutch to be applied to different joints of a toy and serve as a safety device for the purpose of preventing transmission of excessive external force via the gear train to the toy where such excessive force may result in the breaking of toy parts or components. The toy may be a toy such as a robotic toy with a mechanical arm which can grip objects. Such a robotic toy may include a number of joints which hold different parts and components of the toy together, and in some cases, it may be necessary for the clutch assembly to operate as a safety device to ensure that excessive force exerted in lifting/gripping a heavy object does not detrimentally affect, or break, parts of the toy between the motor providing the force for lifting/gripping and the joints subjected to the force.

The friction clutch, according to example embodiments, may take the form of a "wedge friction clutch" or a "radial wedge clutch".

The "wedge friction clutch" is composed of two components: a clutch disc which is connected through its hub to the output gear of a gearbox, and a pressure plate which is attached through its hub to the driven element. The wedge friction clutch operates by way of the principle of wedge friction, i.e. the force (e.g., torque) generated by a motor is transmitted firstly, from the clutch disc to the wedge elements of the pressure plate, and then secondly, to the hexagonal hub of the pressure plate through elastic strips of the pressure plate. In some embodiments, the clutch disc may be connected through its hub to the driven element instead of to the output gear, and the pressure plate may be connected through its hub to the output gear. When the torque safety limit (as implemented by the predetermined clutch slippage force threshold) is about to be exceeded, the wedges of the pressure plate ratchet out of the seats and automatically (without requiring any user intervention) re-engage again after the overload is relieved/dispersed. In this way, the torque drops immediately; and the clutch therefore serves as a safety device by slipping when the torque transmitted through it exceeds a safety/threshold limit, thus preventing the breakage of parts in the transmission train.

The "radial wedge clutch" according to example embodiments is smaller in size than the wedge friction clutch and will be used in more compact environment. It is composed of two components: a clutch disc which is connected through its hub to the output gear of a gearbox; and a thrust ring which is attached through its hub to the driven element. The radial wedge clutch also operates by way of the principle of wedge friction, i.e. the torque from the motor is transmitted from the clutch disc to the elastic wedge elements of the thrust ring to the hexagonal hub. When the torque safety limit is to be exceeded, the wedges of the thrust ring will ratchet out of the seats and re-engage again after the overload is relieved/dispersed. In this way, the torque drops immediately. The radial wedge clutch, like the wedge friction clutch, may in some example embodiments have its clutch disc connected to the driven element instead of to the output gear.

Referring now to the drawings, in which like reference numerals generally designate similar parts throughout the various drawings. FIG. 1 shows an exemplary embodiment of a wedge friction clutch 100 of the new design and assembly method. Wedge friction clutch 100 includes a clutch disc 102 and a pressure plate 104, which engage with each other to drive certain elements of the toy while also providing protection for the interior components of the toy. The wedge friction clutch 100 may also include a gear-engaging member 106 which is connected through the clutch disc hub (e.g., a central opening) to the output gear of a gearbox, and a driven element-engaging member 108 which is attached through the pressure plate's hub to the driving element.

Although the elements of the wedge friction clutch 100 are shown in a certain vertical arrangement in FIG. 1, persons of skill in the art will understand that the wedge friction clutch 100 can be oriented in any direction in the toy. It will also be understood that, although the ordering of items 102-108 is maintained with the clutch disc 102 being adjacent to pressure plate 104 so that wedges in the pressure plate engage in the seats of the clutch disc, the gear-engaging member 106 being fixedly connected to clutch disc 102, and the driven element-engaging member 108 being on the opposite side of the wedged-side (i.e., side including the wedges) of the pressure plate, certain example embodiments may have one or more other parts in the wedge friction clutch 100, without eliminating the capability of the clutch 100 to engage wedges of the pressure plate 104 in the seats of the clutch disc 102.

In certain example embodiments, the wedge friction clutch 100 is arranged inside a robotic arm, robotic wrist or claw, toy parts which are designed to lift/hold weighty objects or other toy component that rotates a part of the toy, and may or may not be externally visible. The rotation enabled by the clutch can be in any direction, e.g., clockwise, counterclockwise, vertically-oriented, horizontally-oriented and/or diagonally-oriented.

The items 102-108 may each be formed with molded plastic or other like materials. The type of material or combination of materials may be selected based upon one or more of the torque threshold (also referred to as "clutch slipping torque threshold") above which clutch is designed and configured to slip effectively as a safety mechanism, the size restrictions imposed on the wedges/seats by the surroundings of where the clutch is to be deployed, the environment in which the clutch will be used, the power of the actuator turning the clutch, etc. The inventors have observed that the clutch is particularly advantageous for use with toy components when no adjustment is required as compared to traditional spring-type clutch device and with toy components that are designed to operate with torque levels in the following range corresponding to different material used.

| Material | Range |
|---|---|
| PC | 5~20 Nm |
| POM | 2~10 Nm |
| PA66 | 1~5 Nm |

The ideal threshold range depends on the material and cross section area of flexible members. In the example embodiment, polycarbonate (PC) is used for the pressure plate 104 and POM is used for the clutch disc 102.

The inventors have also observed that the type of wedge friction clutch of example embodiments may not be effectively and/or advantageously operable at torque thresholds below 1 Nm. It is expected that, for uses as those identified above for which the wedge friction clutch is potentially not effective, other types of clutches, such as the conventional spring/coil clutches, can be used. For wedge friction clutch, it is ideal and effective for the use of weight lifting, self-locking mechanism, manipulator, movement of high moment of inertia. For spring/coil clutches, it is ideal and effective for the use of battery operated toys e.g. cars, constructions without lifting, locomotives, tanks, etc.

Figure 2B:
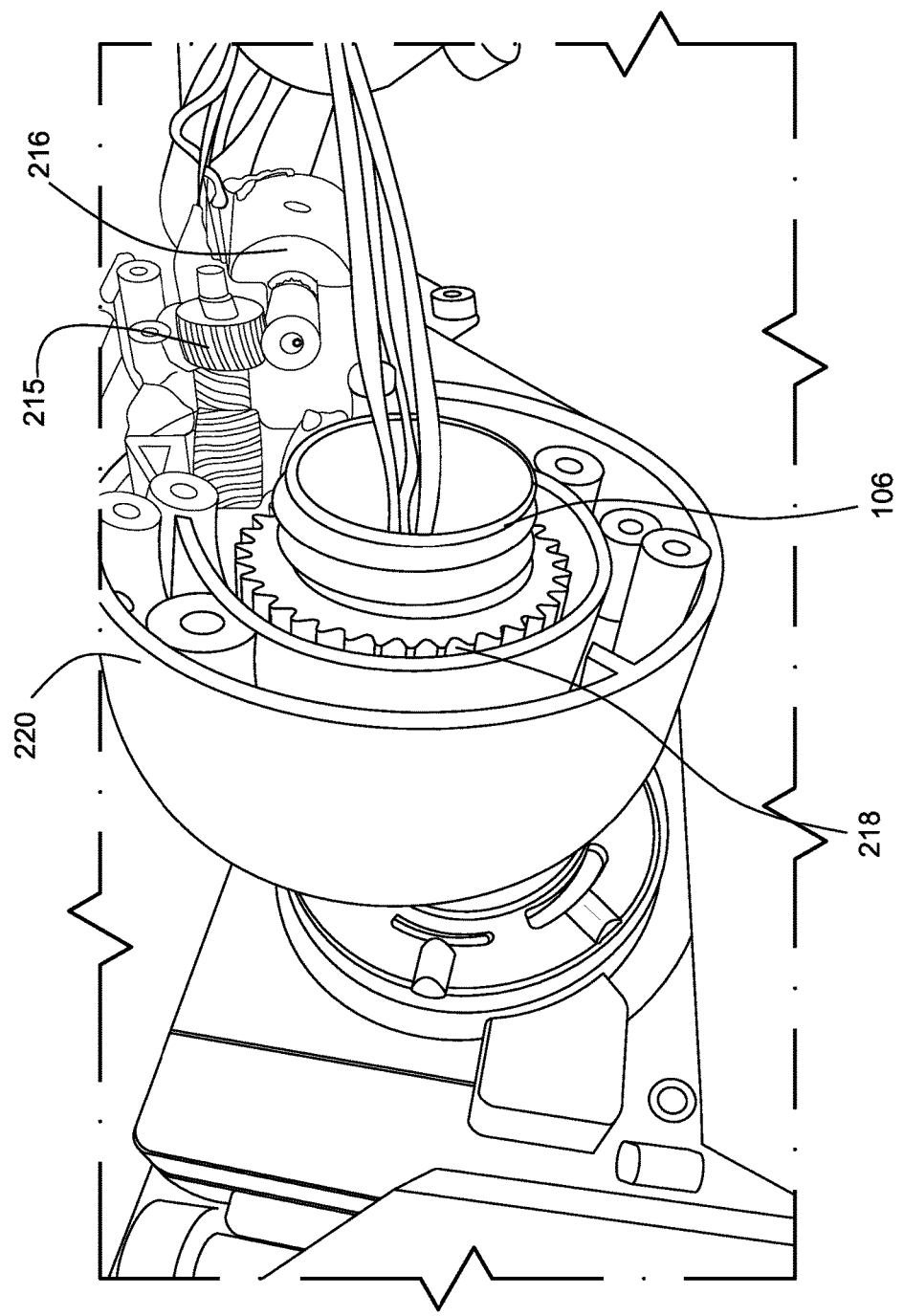
FIG. 2 (FIGS. 2A and 2B) is a view of parts of the wedge friction clutch assembly in a toy according to some example embodiments.
Figure 15:
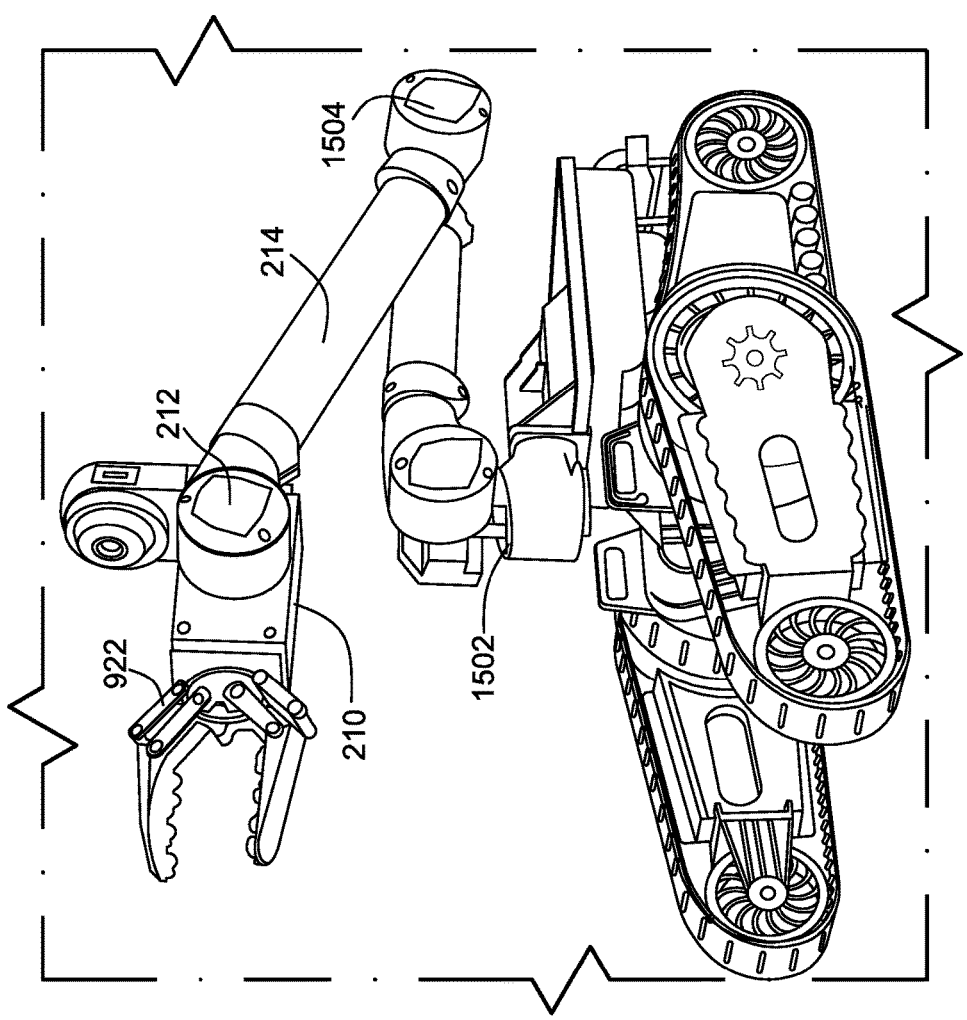
FIG. 15 illustrates an example robotic toy, which includes the clutch assemblies of FIGS. 1 and 8, according to some example embodiments.

FIG. 2 (FIGS. 2A and 2B) provides a view of certain parts of an example wedge friction clutch assembly in a toy such as a toy having a robotic arm like that shown in FIG. 15. FIGS. 2A and 2B show exploded views of a part 212 that is immovably attached to a robotic arm 214 of the toy, where the part 212 connects to a rotatably-attached robotic wrist 210. A motor 216 actuates a gear train 215 that transfers the motor's torque to the gear-engaging member 106. The gear-engaging member 106 is fixedly-attached by a hexagonal hub to the clutch disc 102. The part 212 is attached to robotic wrist 210 such that the wedges of pressure plate 104 are inserted in the seats of clutch disc 102. Thus, when the motor 216, through gear train 215, causes the clutch disc 102 to rotate, the robotic wrist 210, which has pressure plate 104 fixedly-attached to it, is caused to rotate due to the force exerted on the wedges that are inserted in the seats of the rotating clutch disc 102.

The robotic wrist 210 may thus be controlled by actuating the motor 216 in different torque magnitudes and/or in different directions to rotate clockwise or counterclockwise in relation to part 212 that is fixedly-attached to robotic arm 214. As shown in FIG. 2B, the motor 216 may directly rotate a toothed-end that meshes with a gear of the gear train 215. Another gear of the gear train 215 meshes with a toothed circumference 218 of output gear of the gear-engaging member 106 being fixedly connected to clutch disc 102. In this manner, the rotational force of the motor 216, which is transmitted through two or more gears in the gear train 215, is used to rotate the gear engaging member 106.

The motor 216 is a DC motor that can be controlled by a remote control to rotate in either direction. In certain example embodiments, motors of type as listed in below table are used.

| Motor | Motor Torque | Gear Module | Type of Gear |
| --- | --- | --- | --- |
| DC Brush | 6 mN-m | Module 1 | Worm gear & wheel |
| Stepping | 2 mN-m | Module 1 | Worm gear & wheel |

The type, size and number of gears in the gear train 215 may be determined based upon the force requirements and space restrictions.

A cover (not shown in FIG. 2) that fits over robotic wrist base 220 protects the gear train 215, motor 216 and the gear-engaging member 106 from exposure. A lubricant may be used to reduce wear-and-tear on the meshed gears over time. Note, however, that in the exemplary embodiment shown lubricant is neither necessary nor desirable on the sides of the clutch disc 102 and pressure plate 104 that engage with each other.

Figure 3:
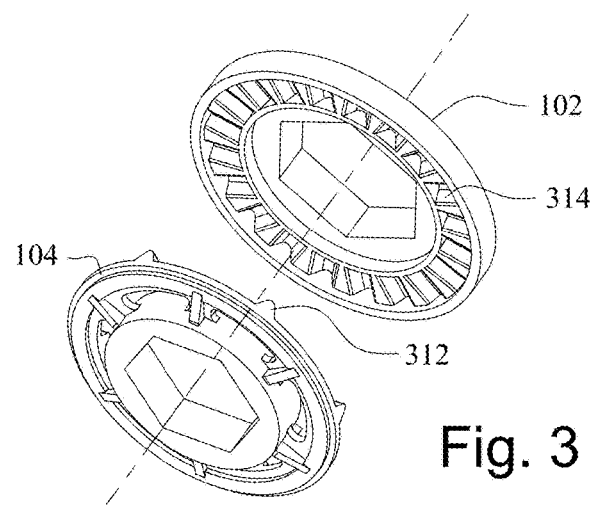
FIG. 3 is a side view of the pressure plate and the clutch disc of the wedge friction clutch assembly according to some example embodiments.
Figure 4:
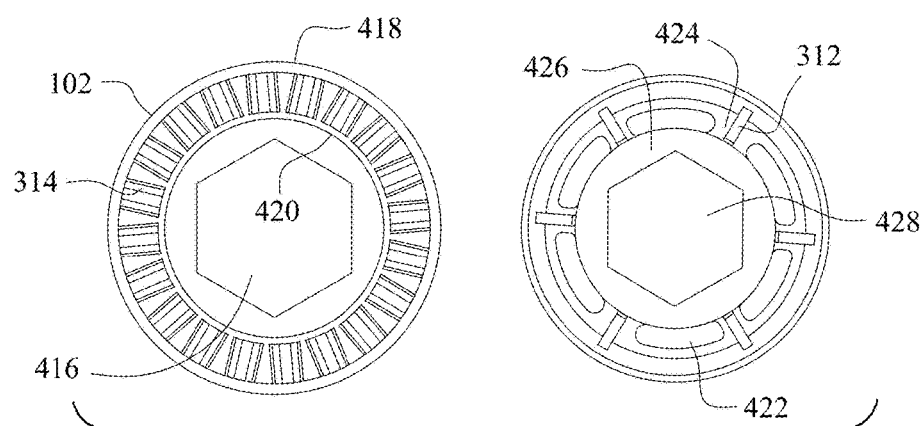
FIG. 4 is a bottom view of the clutch disc of the wedge friction clutch and a top view of a pressure plate of the wedge friction clutch according to some example embodiments.
Figure 5:
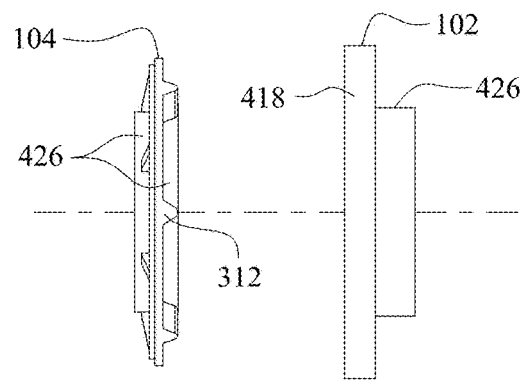
FIG. 5 is a side view of the clutch disc and the pressure plate of the wedge friction clutch in FIG. 4 according to some example embodiments.

FIGS. 3-5 show more details of the clutch disc 102 and pressure plate 104 of the wedge friction clutch assembly 100 according to some example embodiments. FIG. 3 is a side view of the pressure plate 104 and the clutch disc 102 shown oriented in relation to each other as required for use in a toy. That is, the pressure plate 104 and the clutch disc 102 are shown in the directional orientation which enables the wedges 312 on the top side of the pressure plate 104 to engage in the seats 314 on the bottom side of the clutch disc 102, when the pressure plate 104 and the clutch disc 102 are rotatably fixed in close proximity to each other. The close proximity between the pressure plate and the clutch disc enables the clutching torque to be at the designed value, otherwise the clutching torque will be lower than the designed value.

The clutch disc 102 includes a plurality of seats (grooves) 314 on its bottom surface arranged in a circular pattern. The seats 314 may, in certain example embodiments, be evenly distributed throughout the circumference of the clutch disc on its bottom surface. An elevated area separates each pair of seats. Each seat 314 is shaped to receive a wedge-shaped ridge (referred to as a "wedge"). That is, in some example embodiments, each seat 314 has a wider opening at the bottom surface of the clutch disc, which tapers down at a predetermined angle on either side to end in a thinner edge. The angle of the wedge during clutching, for example in this embodiment, is 60 degrees. It is a determined factor affecting the static friction.

The pressure plate 104 includes a plurality of wedges 312. Each wedge is designed to fit in to a seat 314. Each wedge is designed to have a thick end and a thin edge, with the thin edge of the wedge being designed to be inserted in a seat 314. Each triangular wedge-shaped wedge is designed to be inserted into a seat. In the illustrated embodiment each wedge 312 is designed to be inserted to any of the seats 314, but alternative embodiments may have one or more wedges that are designed to insert into only some seats of the clutch disc.

The wedges 312 and the seats 314 are radially aligned as shown. The length of a seat in the radial direction may be exactly dimensioned to fit a wedge. The length of a seat in the radial direction may be greater than the width of the seat at its widest portion. A boundary wall may be formed on either end of a seat in the radial direction, which may help hold the wedges in a snug fit despite some movements of the parts of the toy in which the clutch is deployed.

In some example embodiments, the wedges 312 are all substantially identical with respect to each other, and the seats 314 are all substantially identical with respect to each other. The wedges 312 and the seats 314 may be sized and shaped so that a wedge fits snugly into a seat. That is, when completely (fully) engaged in a coupled state, the wedges fit snugly in the seats such that there is no rotational movement relative to each other between the clutch disc 102 and the pressure plate 104. In example embodiments, there must be no relative movement in the fully engaged position necessary to ensure no backlash and reliable & accurate clutching torque. In some example embodiments, a minimal amount (i.e. 0.1 mm) of relative rotational movement in the fully engaged condition may be allowed without detrimentally affecting the driving capability or the safety capability of the wedge friction clutch 100. Beyond that allowable rotational movement, however, the driving capability will lag behind and the safety capability compromised.

FIG. 4 provides a bottom view of the clutch disc 102 and a top view of a pressure plate 104. The seats 314 in clutch disc 102 are shown evenly distributed throughout the circumference of the bottom surface of the clutch disc 102. As shown, a central hole 416 in the clutch disc 102 is a hub that can attach to a driving or driven component. In some example embodiments, the hub has a hexagon shape. The hub may have a wall around its perimeter sized so as to provide sufficient fit for a similarly shaped shaft that either exerts pressure to rotate the clutch disc or receives torque from the clutch disc hub to rotate itself, depending on the embodiment. The height of the perimeter wall may be taller than the depth of the seats 314, and, at least in some embodiments, may be formed from a different (or reinforced) material than the rest of the clutch disc. The perimeter wall in this embodiment may be made of POM which is a self-lubricated material.

As noted above, the seats may be bounded by a perimeter wall 418 and an inner wall 420 in the radial direction. The seats may not extend, as in the embodiment shown in FIG. 4, beyond the entire radial length between the perimeter wall and the hub opening. However, other embodiments may have seats (and corresponding wedges) that extend a longer distance or the entire distance along the radial direction between the perimeter wall and the hub opening.

The circumferential area in the pressure plate 104 in which the wedges 312 are arranged is laid out as two circumferential strips: the outer strip has the wedges arranged in a radial direction, and the inner strip has an open area (a hole) 422 between each wedge and a wall 426 around hub 428. Thus, each of the wedges 312 extends from the perimeter of the pressure plate 104 to a side of a hole 422, the opposite side of the hole 422 being bounded by the wall 426. Each hole 422 may have an elongated shape being substantially longer in the circumferential direction than its length in the radial direction. The holes 422 are arranged such that between each pair of holes 422 an elastic strip 424 exists connecting the outer circumferential strip to the wall 426. In example embodiments, the size of the elastic strips 424, and consequently the size of the holes 422, are determined based upon amount of maximum torque force tolerated by the clutch before slipping. For example, for high force threshold the required elasticity in the pressure plate 104 may be higher, than that required for lower force threshold requirements. The size and/or material composition of the elastic strips 424 may be configured in accordance with the required elasticity.

The wall 426 may be formed so that its outer perimeter is circular and bounds the holes 422 and elastic strips 424. The inner perimeter of the wall 426 may form a hexagonal opening 428 in the center of the pressure plate 104. The height of the wall 426 may be dimensioned to provide sufficient fit for a similarly shaped shaft that either exerts pressure to rotate the clutch disc or receives force from the pressure plate hub to rotate itself, depending on the embodiment.

The clutch assembly may be designed such that the wall 426 fits within a similarly shaped depression on the bottom side of the clutch disc 102 surrounding the hub 416. In the coupled condition (see description of FIG. 6 below), the bottom surface of the pressure plate 104 may be flush with the bottom edge of the perimeter wall 418.

FIG. 5 is a side view of the clutch disc 102 and the pressure plate 104 of the wedge friction clutch in FIG. 4. The side view of clutch disc 102 shows the perimeter wall 418 and the inner perimeter of a wall 426 surrounding the hub 416 and extending above the perimeter wall 418. The side view of pressure plate 104 shows the pressure plate on which the wedges 312 are arranged, and the wall 426 extending from the top and bottom sides of the pressure plate.

In the illustrated example embodiment of the wedge friction clutch 100, 20 seats are evenly circumferentially distributed on the bottom surface of the clutch disc 102, and 6 wedges are circumferentially distributed on the top surface of the pressure plate. The diameter of the clutch disc 102 and also of the pressure plate 104 in the illustrated embodiment is 46 mm. However, it will be understood that the diameter may be different in other embodiments, and may be chosen in accordance with the toy components in which the clutch is to be deployed.

FIG. 6 illustrates the coupling (resetting) and decoupling (clutching) in the wedge friction clutch, according to come example embodiments. Specifically, schematics 602A, 604A and 606A illustrate an initial coupled condition, a decoupled condition upon exceeding a threshold rotational force, and the ensuing coupled condition when the force is sufficiently reduced, respectively. Correspondingly, 602B, 604B and 606B illustrate perspective views for the initial coupled condition, the decoupled condition, and the ensuing coupled condition. The cross-sections illustrated are from the perspective of a cut where a wedge 312 on either side of the pressure plate 104 across a diameter is sliced in the middle.

The initial coupled condition is effective during normal operation of the wedge friction clutch 100. In this condition, each wedge 312 in the pressure plate 104 is fully inserted in a seat 314 of the clutch disc 102. The normal operation may include situations in which the wedge friction clutch is either not being subjected to rotational force or is being subjected to rotational force not exceeding a threshold.

As shown in 602A, the wedges of pressure plate 104 are each fully inserted in the seats of clutch disc 102. The perspective view 602B shows that in this condition that clutch disc 102 and pressure plate 104 are engaged, with the pressure plate 104 being flush with the bottom of the clutch disc 102. In this condition, the engagement between the clutch disc 102 and the pressure plate 104 does not cause any (or any substantial) deformation of the pressure plate 104.

Schematic 604A and perspective view 604B show the decoupling condition that occurs when the rotational force exerted in the situation of schematic 602A exceeds the threshold for which the wedge friction clutch is designed. When the force exceeds the threshold, the wedges slip from (or ratchet out) their respective seats so that the pressure plate or the clutch disc, whichever being driven by a motor, rotates freely, or substantially freely (e.g., without the wedges engaging in the seats for significant lengths of time), thereby releasing the force and/or pressure that may otherwise exert on the internal components of the toy.

In the decoupled state, as shown in schematic 604A, the wedges slip to just outside of the seats. In the illustrated embodiment, the wedges slip to the level of being above the top of inner wall of the clutch disc. With the wedges at that level, there is no rotational pressure being transferred between the clutch disc and the pressure plate. As shown in the schematic 604A, in the decoupled condition there is a space between the top of a wedge and the bottom of the seat. This separation may be, at least in one embodiment, about 2.0 mm. This is in contrast to the condition shown in schematic 602A where there is no space, or only a very small space, between the top of the wedge and the bottom of the seat.

In this decoupled condition, as shown in perspective view 604B, the wedges slipping out of the respective seats thereby causing the pressure plate 104 to be deformed due to its elasticity. The deformation is in the form of bending in the locations of the respective wedges.

After slippage, the wedge friction clutch 100 again re-engages when the rotational force falls below the threshold. This subsequent coupled state is illustrated in the schematic 606A and perspective view 606B. The description of the schematic 606A and perspective view 606B is identical to that of the schematic 602A and perspective view 602B.

Figure 7A:
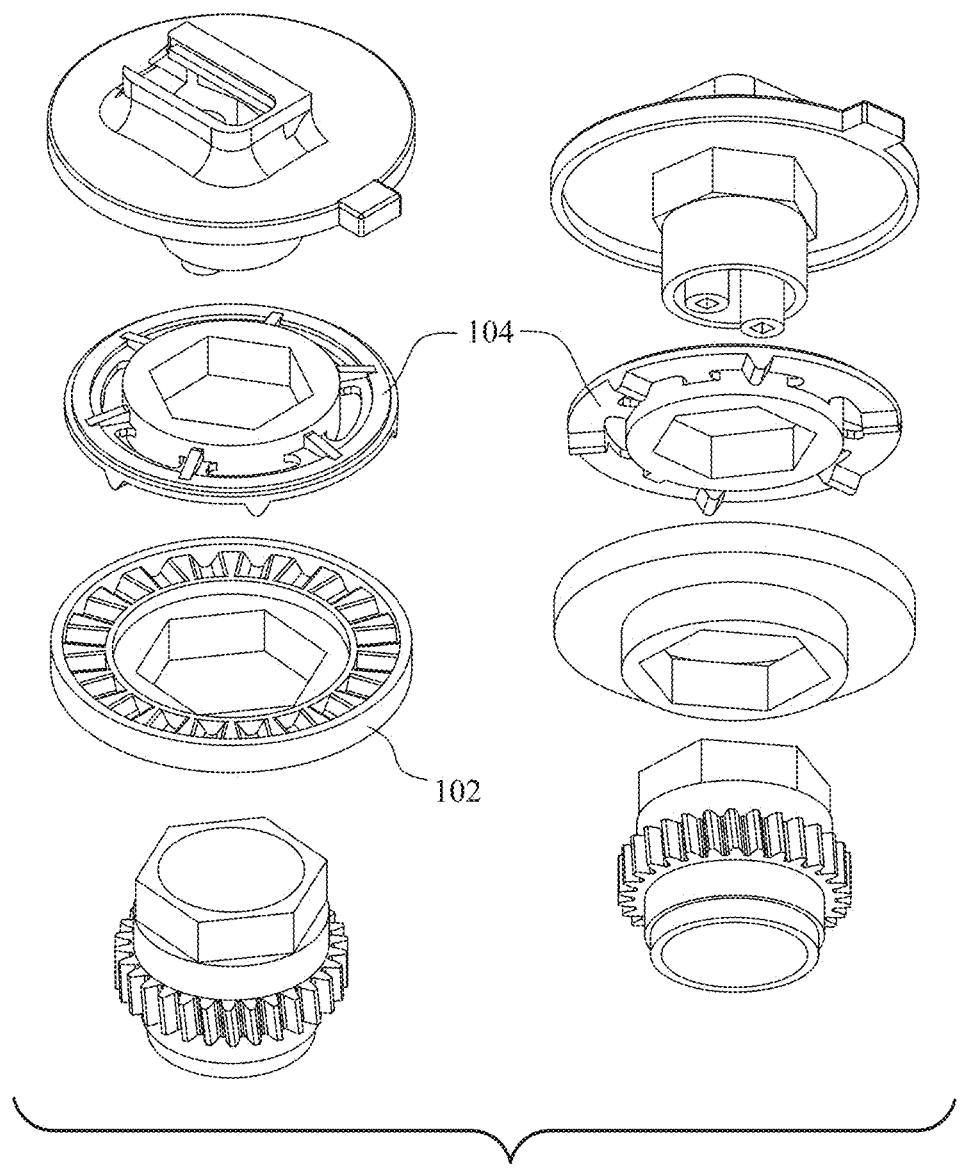
FIG. 7 (FIGS. 7A and 7B) is an exploded view of the wedge friction clutch in the coupled condition and in the decoupled condition according to some example embodiments.
Figure 7B:
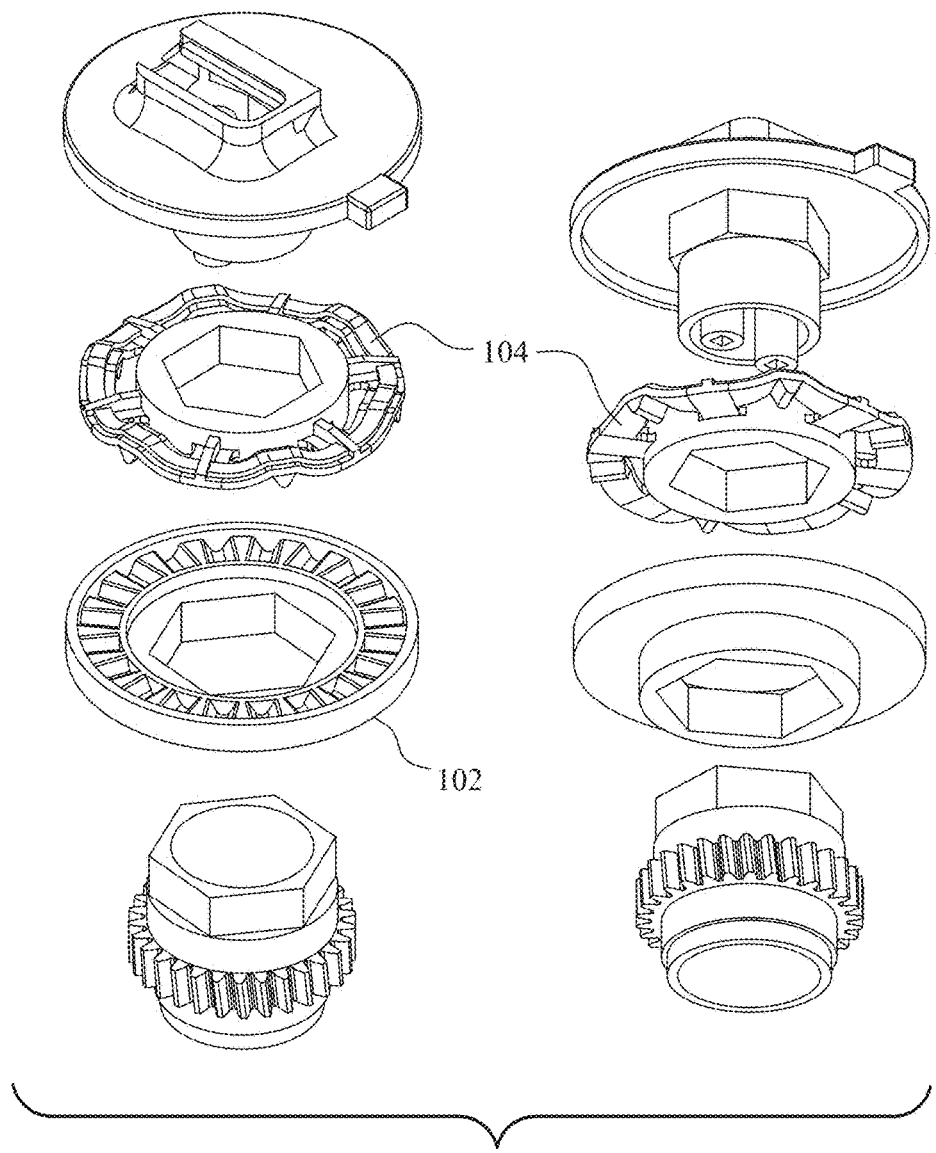

FIG. 7 (FIGS. 7A and 7B) is an exploded view of the wedge friction clutch in the coupled condition and in the decoupled condition according to some example embodiments. FIG. 7A shows two different views of the wedge friction clutch 100 components 102-108, as they would be during normal operation in a coupled state. FIG. 7B shows the two different vertical views, but showing components 102-108 as they would appear during a decoupled state. Comparing FIG. 7A to 7B, it is shown that the pressure plate 104 is deformed in the decoupled condition. More particularly, FIG. 7B illustrates parts of the pressure plate 104 deforming into a wave pattern along the circumference as the wedges are subjected to the exceeding force threshold against the clutch disc.

Figure 8:
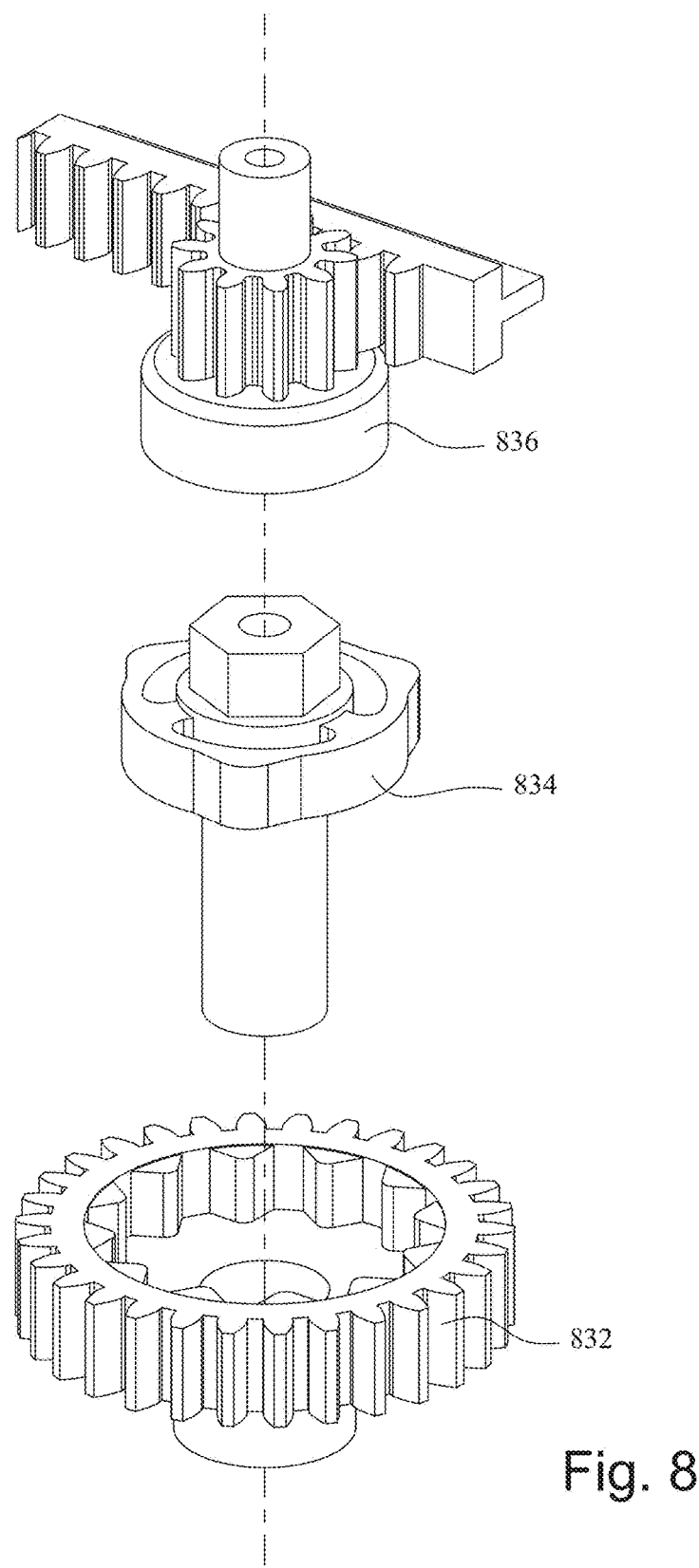
FIG. 8 is a partly exploded view of a radial wedge clutch assembly according to some example embodiments.

FIG. 8 shows an example of the radial wedge clutch embodiment. Radial wedge clutch assembly 800 includes a clutch disc 832 and a thrust ring 834, which engage with each other to drive certain elements of the toy while also providing protection from damage for the interior components of the toy. The radial wedge clutch 800 may also optionally include a gear-engaging member 836 which connects the thrust ring 834 to the output gear of a gearbox. An optional drive element-engaging member (not shown) may be attached through the clutch disc 832 hub to a drive element.

Although the elements of the radial wedge clutch 800 are shown in a certain vertical arrangement in FIG. 8, as described above in relation to the wedge friction clutch 100, the radial wedge clutch 800 too can be oriented in any direction as needed for the toy. For example, the items 832-836 can be arranged in any direction. Certain example embodiments may have one or more other parts in the radial wedge clutch 800 without eliminating the capability of the clutch 800 to engage wedges of the thrust ring 834 in the seats of the clutch disc 832.

In certain example embodiments, the radial wedge clutch 800 is arranged inside a robotic arm, robotic wrist or claw, locomotive driving wheels, construction toys (e.g. bulldozer, excavator arm, loader, tower crank), train (e.g. animation figure) or other toy component that rotates a part of the toy, and may or may not be externally visible. As with the wedge friction clutch, the rotation enabled by the radial wedge clutch can be in any direction, e.g., clockwise, counterclockwise, vertically-oriented, horizontally-oriented and/or diagonally-oriented. In some example embodiment, the radial wedge clutch 800 can be preferably used in tighter spaces, rather than the wedge friction clutch 100. The advantages of the radial wedge clutch are compact in size and easy for simple assembly. And its disadvantages are less reliable, less accurate and can only operate within a narrow torque range.

The items 832-836 may each be formed with molded plastic. The inventors have observed that the radial wedge clutch is particularly advantageous for use with toy components that are designed to operate with force levels in the range of below table.

| Clutch Disc | Thrust Ring | Range |
| --- | --- | --- |
| POM | PA | 2~5 Nm |
| POM | POM | 5~15 Nm |
| POM | PC | 15~50 Nm |

The inventors have also observed that the type of radial wedge clutch of example embodiments may not be effectively and/or advantageously operable at force thresholds as listed below.

| Clutch Disc | Thrust Ring | Range |
| --- | --- | --- |
| POM | POM | 0.1~0.5 Nm |
| PC | PC | 0.5~1.0 Nm |
| PA | PC | 0.5~1.0 Nm |

Figure 9:
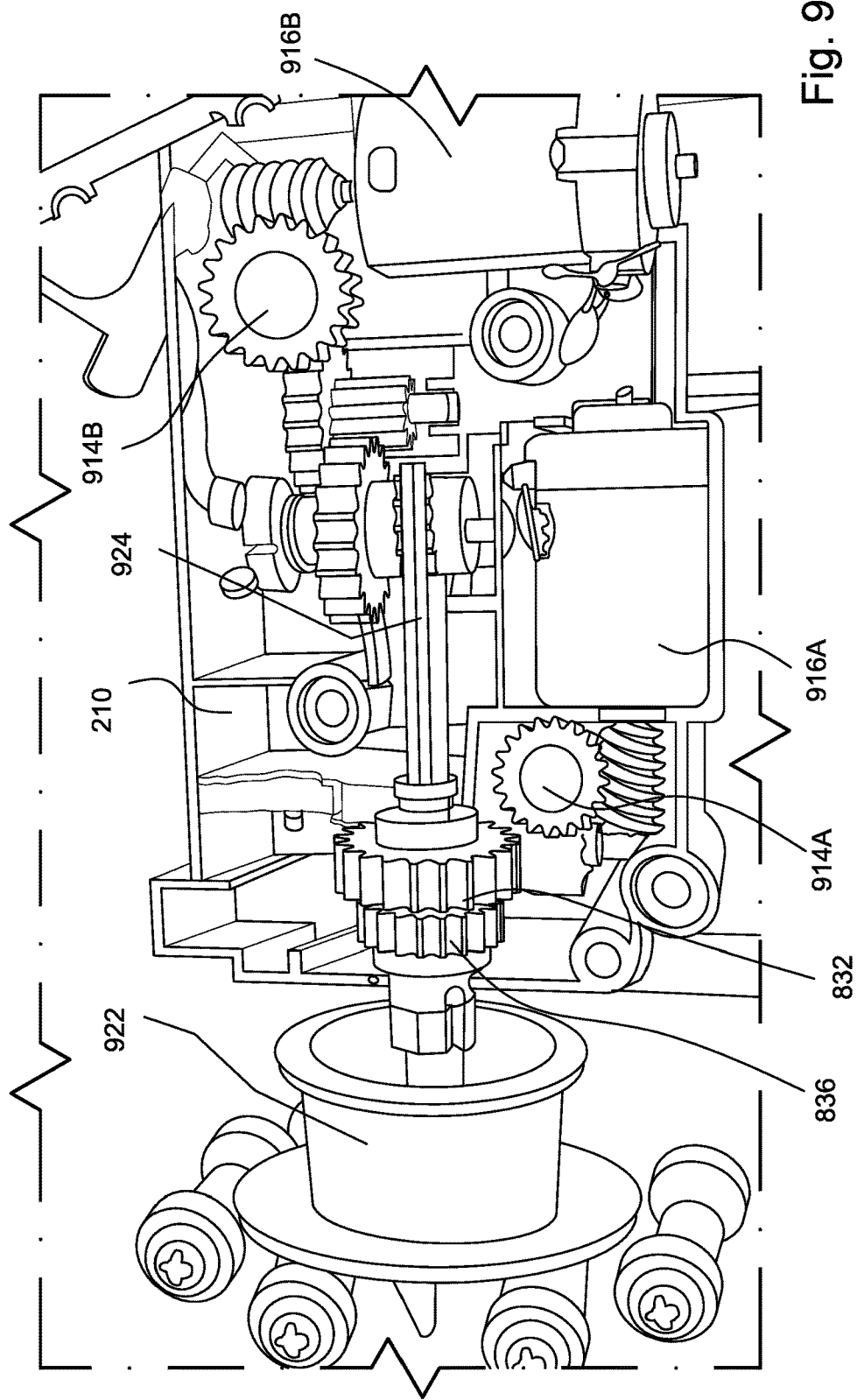
FIG. 9 (FIGS. 9A and 9B) is a view of parts of the radial wedge clutch assembly in a toy according to some example embodiments.

FIG. 9 provides a view of certain parts of an example radial wedge clutch 800 assembly in a toy such as a toy having a robotic arm like that shown in FIG. 15. The figure shows a view of a robotic wrist 210 that is rotatably-attached to a robotic arm 214 of the toy (see FIG. 2 above). Motors 916A and 916B actuate respective gear assemblies 914A and 914B that transfer the motors' force to operate the robotic claw 922. Motor 916A operates the gear assembly 914A, which has at least one gear meshed with the circumferential teeth of the clutch disc 832, to transfer the rotational force of the motor to the radial wedge clutch 800 by rotating the clutch disc 832. The clutch disc 832 and thrust ring 834 are arranged during normal operation such that the wedges of thrust ring 834 are inserted in the seats of clutch disc 832. Thus, when the motor 916A, through gear assembly 914A, causes the clutch disc 832 to rotate, the thrust ring 834 is caused to rotate by its wedges inserted in the seats of the clutch disc 832. Then the claw 922 rotates because the claw is fixed to the thrust ring 834 by its hub.

Motor 916B operates the gear assembly 914B, which has at least one gear mesh with a shaft 924 that extends through the hub of the radial wedge clutch 800, to move the shaft 924 back and forth. Thus, motor 916B can be operated to open and close the robotic claw 922 by moving the shaft 924 that is connected at one end to the robotic claw 922.

The motors 916A-B may be of the same type and configuration as the motor 216 described above. A cover (not shown in FIG. 9) that fits over robotic wrist 210 protects the gear assemblies 914A-B, motors 916A-B and other components from exposure.

Figure 10:
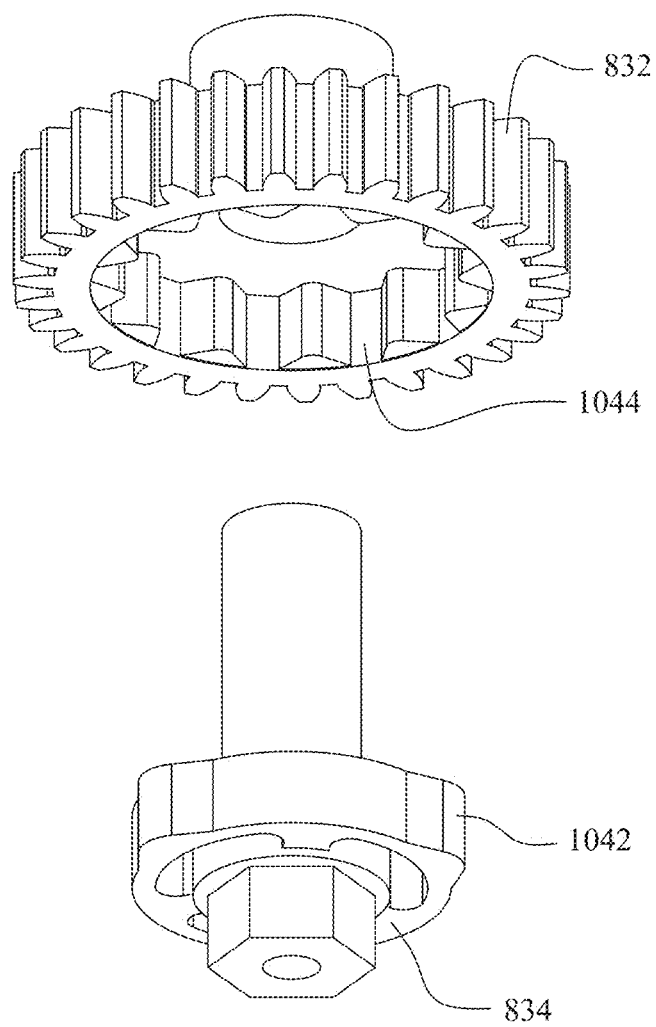
FIG. 10 is a side view of the thrust ring and the clutch disc of the radial wedge clutch assembly according to some example embodiments.
Figure 11:
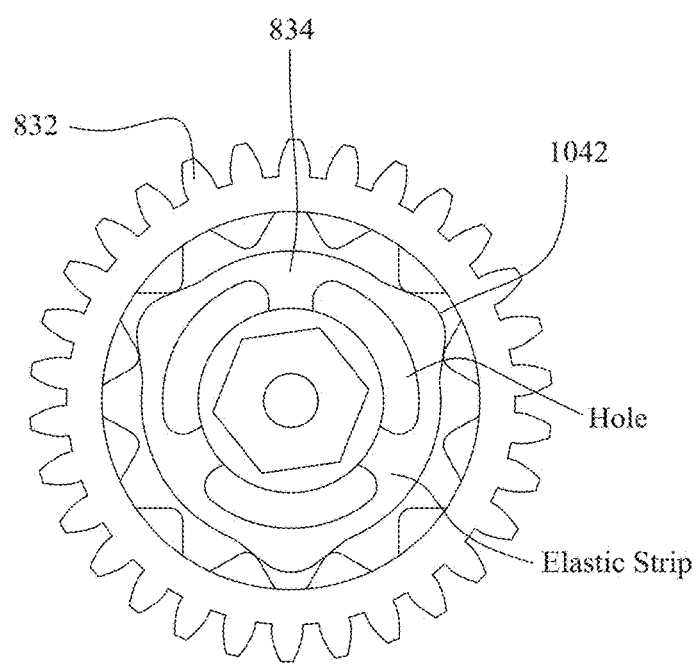
FIG. 11 is a bottom view of the clutch disc of the radial wedge clutch and a top view of a thrust ring of the radial wedge clutch according to some example embodiments.
Figure 12:
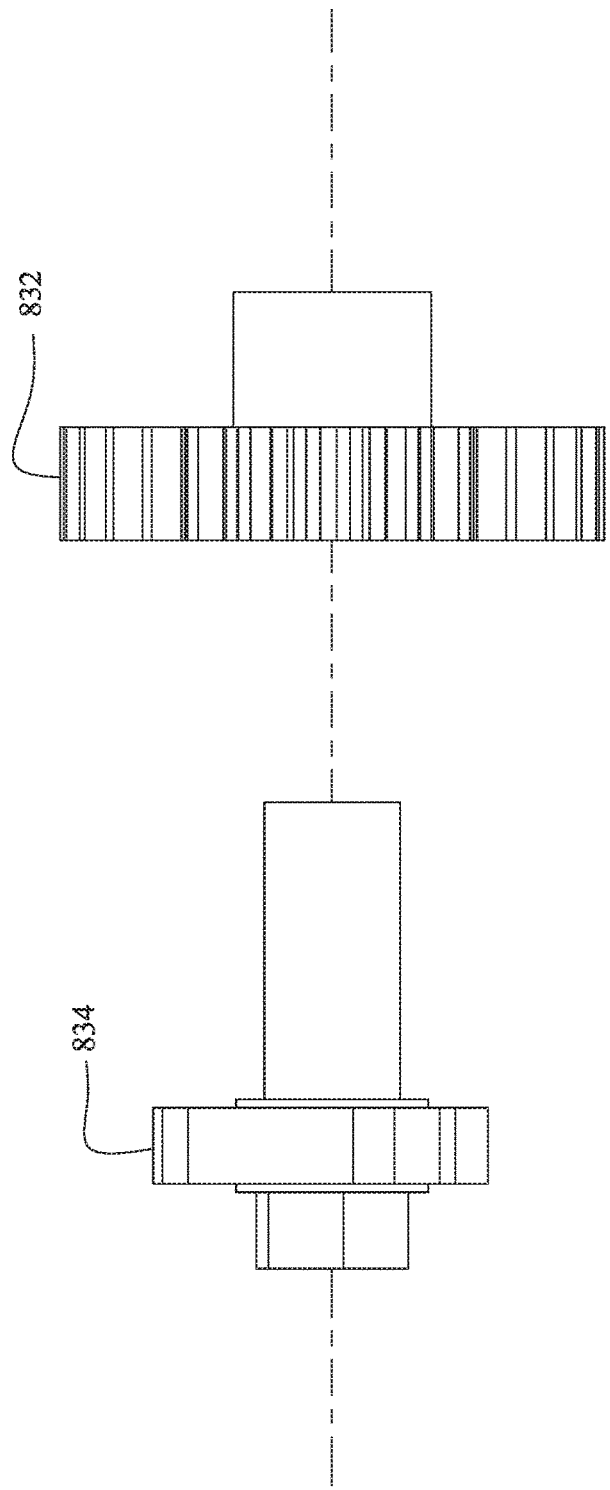
FIG. 12 is a side view of the clutch disc and the thrust ring of the radial wedge clutch in FIG. 11 according to some example embodiments.

FIGS. 10-12 show more details of the clutch disc 832 and thrust ring 834 of the radial wedge clutch assembly 800 according to some example embodiments. FIG. 10 is a side view of the thrust ring 834 and the clutch disc 832 shown oriented in relation to each other as required for use in a toy. That is, the thrust ring 834 and the clutch disc 832 are shown in the directional orientation which enables the wedges 1042 on the top side of the thrust ring 834 to engage in the seats 1044 on the bottom side of the clutch disc 832, when the thrust ring 834 and the clutch disc 832 are placed in position during normal operation of the toy.

The clutch disc 832 includes a plurality of seats 1044 on the inner-side of a circumferential perimeter wall. The seats 1044 may, in certain example embodiments, be evenly distributed throughout the circumference of the clutch disc on the perimeter wall. A jutting out area separates each pair of seats. Each seat 1044 is shaped to receive an extension from the thrust ring. That is, in some example embodiments, each seat 1044 has a wide opening, which tapers down at a predetermined angle on either side to end in a thinner edge.

The thrust ring 834 includes a plurality of extensions 1042 around the circumference. The extensions are shaped as wedges designed to fit in to a seat 1044. Each wedge is designed in the shape of having one thick end and tapering to a thinner end, with the thinner end of the wedge being designed to be inserted in a seat 1044.

In the illustrated embodiment, the length of a seat 1044 extends substantially to the entire height of the disc portion of the clutch disc 832, and the wedges 1042 are also as high as the ring portion of the thrust ring 834. However, embodiments are not limited to the height of the seats extending the entire height of the disc portion and/or the height of the wedges extending the entire height of the ring portion. Note also that the illustrated embodiment does not have walls on either end of the seats.

In some example embodiments, the wedges 1042 are all substantially identical with respect to each other, and the seats 1044 are all substantially identical with respect to each other. In some example embodiments, when completely (fully) engaged in a coupled state, the wedges fit snugly in the seats such that there is no rotational movement relative to each other between the clutch disc 832 and the thrust ring 834. In example embodiments, it is desired that there must be no relative movement in the fully engaged position. Otherwise, it may induce clearance in output movement and also lowers the clutching torque. In some example embodiments, a minimal amount (i.e. 0.1 mm) of relative rotational movement in the fully engaged condition may be allowed without detrimentally affecting the driving capability or the safety capability of the radial wedge clutch 800.

FIG. 11 provides a top view of the clutch disc 832 with the thrust ring 834 positioned within during normal operation of a toy. FIG. 12 is a side view of the clutch disc 832 and the thrust ring 834.

The seats 1044 are shown evenly distributed throughout the inner side of the circumferential perimeter wall of the clutch disc 832. The shaft of the thrust ring 834 fits in through a central hole in the clutch disc 832. The shaft, as described above, is fixedly-attached to the thrust ring so that the rotational movement of the thrust ring also rotates the shaft. When thrust ring 834 is positioned within the clutch disc 832, the shaft extends from the bottom side of the thrust ring 834 through the central hole of the clutch disc 832, thus ensuring coaxial positioning of the clutch disc 832 and thrust ring 834. On the other side (top side) of the thrust ring 834, is a hexagonal hub attachment which may be engaged with a driving (or driven) element to either drive (or be driven by) the rotation of the clutch 800. The hexagonal shape is advantageous for reliable and efficient engagement with another component of the toy, but some embodiments may have differently shaped hubs.

The wedges 1042 are distributed on the circumferential wall of the thrust ring 834 such that each wedge extends radially outward. In the embodiment illustrated, three wedges 1042 are distributed evenly throughout the circumference of the thrust ring 834. The circumferential area having the wedges is connected to a circular hub area of the thrust ring 834 by a plurality of narrow strips that separate circumferentially elongated holes (cutout areas) in the thrust ring 834. Each hole may have an elongated shape being substantially longer in the circumferential direction than its length in the radial direction. The holes are arranged such that between each pair of holes the thin elastic strip exists connecting the outer circumferential strip to the hub area of the thrust ring. The higher the torque is, the greater the number of holes and the larger the size of the strips are. In example embodiments, the size of the elastic strips, and consequently the size of the holes, are determined based upon amount of maximum torque tolerated by the clutch before slipping. For example, for high force thresholds the required elasticity in the thrust ring 834 may be higher, than that required for lower force threshold requirements. The size and/or material composition of the elastic strips may be configured in accordance with the required elasticity.

The clutch may be designed such that the ring portion of the thrust ring 834 fits entirely within the clutch disc 832, with the shaft of the thrust ring extending out from the central hole of the clutch disc and the hexagonal hub of the thrust ring extending from the other side. In the coupled condition and also the decoupled condition (see description of FIG. 13 below), the bottom surface of the thrust ring 834 may sit on a floor of the clutch disc 832 such that the top of the ring portion of the thrust ring is flush with the top of the disc portion of the clutch disc 832.

As shown in the side view illustrated in FIG. 12, the diameter of the thrust ring may be 11.6 mm including the wedges.

FIG. 13 illustrates the coupling (resetting) and decoupling (clutching) in the radial wedge clutch, according to come example embodiments. Specifically, top views 1302A, 1304A and 1306A illustrate an initial coupled condition, a decoupled condition upon exceeding a threshold rotational force, and the ensuing coupled condition when the force is sufficiently reduced, respectively. Correspondingly, 1302B, 1304B and 1306B illustrate perspective views for the initial coupled condition, the decoupled condition, and the ensuing coupled condition.

The initial coupled condition is effective during normal operation of the radial wedge clutch 800. In this condition, each wedge 1042 in the thrust ring 834 is fully inserted in a seat 1044 of the clutch disc 832. The normal operation may include situations in which the radial wedge clutch is either not being subjected to rotational force or is being subjected to rotational force that has not reached the threshold.

As shown in top view 1302A, the wedges of thrust ring 834 are fully inserted in the seats of clutch disc 832. The perspective view 1302B shows that in this condition that clutch disc 832 and thrust ring 834 are engaged, with the top of the ring portion of the thrust ring 834 being flush with the top of the disc portion of the clutch disc 832. In this condition, the engagement between the clutch disc 832 and the thrust ring 834 does not cause any (or any substantial) deformation of the thrust ring 834.

Top view 1304A and perspective view 1304B show the decoupling condition that occurs when the rotational force exerted in the situation of top view 1302A exceeds the threshold for which the radial wedge clutch is designed. When the force exceeds the threshold, the wedges slip from (or ratchet out) their respective seats so that the thrust ring or the clutch disc, whichever being driven by a motor, rotates freely, or substantially freely, thereby releasing the force and/or pressure that may otherwise be exerted in the internal components of the toy.

In the decoupled state, as shown in top view 1304A, the wedges slip to just outside of the seats. In the illustrated embodiment, the wedges slip to the level of being just outside circumferential perimeter inner wall of the clutch disc. With the wedges outside the seats, there is no rotational pressure being transferred between the clutch disc and the thrust ring. As shown in the top view 1304A, in the decoupled condition there is a space between the top of a wedge and the bottom of the seat. This separation may be, at least in one embodiment, about 0.7 mm. This is in contrast to the condition shown in top view 1302A where there is no space, or only a very small space, between the top of the wedge and the bottom of the seat.

In this decoupled condition, as shown in perspective view 1304B, the wedges slipping out of the respective seats thereby causing the thrust ring 834 to be deformed due to its elasticity. The deformation is in the form of bending in the locations of the respective wedges.

After slippage, the radial wedge clutch 800 again re-engages when the rotational force falls below the threshold. This subsequent coupled state is illustrated in the top view 1306A and perspective view 1306B. The description of the top view 1306A and perspective view 1306B is identical to that of the top view 1302A and perspective view 1302B.

Figure 14A:
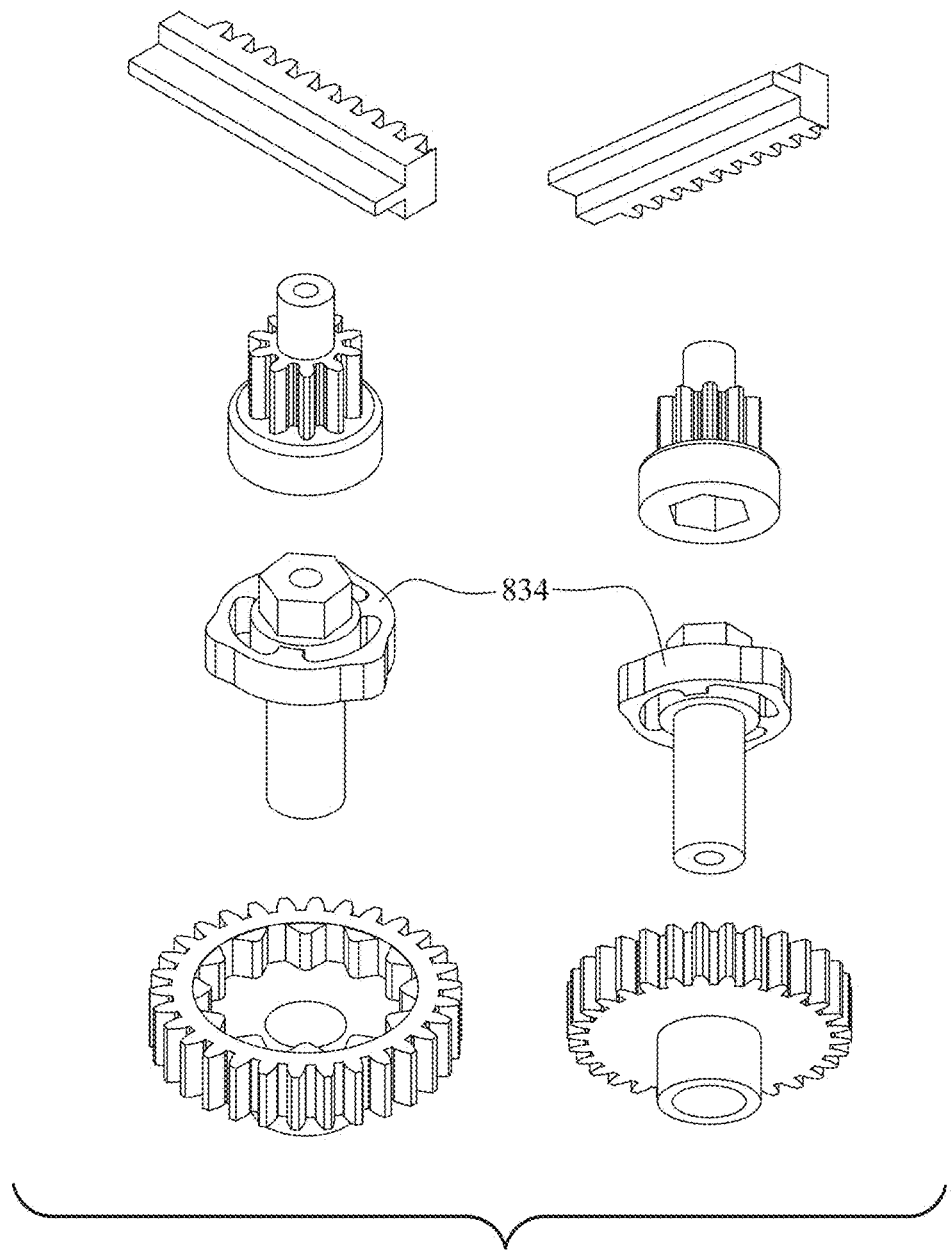
FIG. 14 (FIGS. 14A and 14B) is an exploded view of the radial wedge clutch in the coupled condition and in the decoupled condition according to some example embodiments.
Figure 14B:
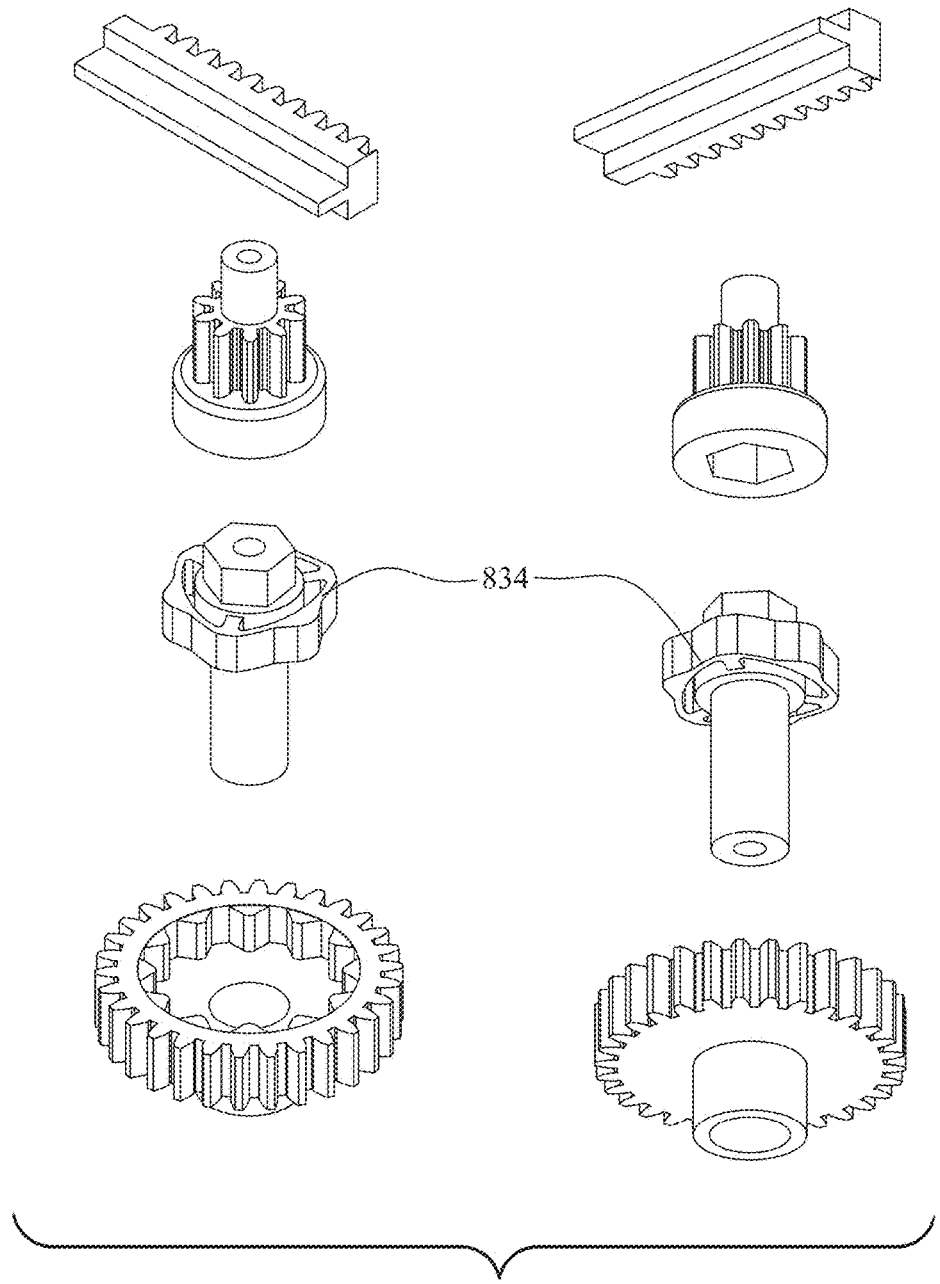

FIG. 14 (FIGS. 14A and 14B) is an exploded view of the radial wedge clutch in the coupled condition and in the decoupled condition according to some example embodiments. FIG. 14A shows two different vertical views of the radial wedge clutch 800 components 832-838, as they would be during normal operation in the coupled state. FIG. 14B shows the two different vertical views, but showing components 832-838 as they would appear during a decoupled state. Comparing FIG. 14A to 14B, it is shown that the thrust ring 834 is deformed in the decoupled condition. In particular, in FIG. 14B, the wedges 1042 around the circumference of the thrust ring 834 are further removed and detached from the seats 1044 as compared to the coupled state in FIG. 14A.

FIG. 15 shows an example robotic toy 1500 that utilizes the wedge friction clutch 100 and the radial wedge clutch 800, according to some example embodiments. The toy 1500 includes the robotic arm assembly 214 which, as described above, may use the wedge friction clutch 100 in the connection between the robotic arm 214 and robotic wrist 210. Additionally, also as described above, the radial wedge clutch 800 can be used for connection between the robotic wrist 210 and robotic claw 922. The toy 1500 may be designed specifically for lifting/carrying of items less than a predetermined weight (e.g., 6 ounces) and/or size (e.g., 3 inches), so as not to exceed the clutch slip force thresholds of the wedge friction clutches 100 and radial wedge clutches 800 used therein. In addition to its use in part 212, the wedge friction clutch may also be used, for example, in the joints 1502 and 1504.

It is to be understood that the invention is not to be limited to the disclosed embodiments; on the contrary, it is intended to cover various modifications and equivalent arrangements included within the spirit and scope of the appended claims.

What is claimed is:

1. A clutch assembly for a toy, comprising:
a clutch disk member having a central opening and a plurality of seats distributed in a circular pattern;
an inserting member having a plurality of wedges distributed in a circular pattern,
wherein the seats and the wedges are composed and dimensioned to (A) engage the wedges in the seats when a force exerted between a driving element operably connected to the clutch disk member and a driven element operably connected to the inserting member is less than a predetermined force level, and (B) automatically disengage the wedges from the seats when the force exerted exceeds the predetermined force level,
wherein the seats are arranged facing inside on a perimeter rim of the disk member, and the wedges are arranged on a perimeter rim of the inserting member facing outward,
wherein the inserting member includes a plurality of openings distributed in a circular strip between the perimeter and the central opening, and wherein a plurality of elastic strips separate respective ones of the openings.

2. The clutch assembly according to claim 1, arranged to, subsequent to automatically disengaging when the force exerted exceeds the predetermined force level, automatically re-engage the wedges in the seats when the force exerted falls below the predetermined force level.

3. The clutch assembly according to claim 1, wherein the seats and the wedges are molded plastic.

4. The clutch assembly according to claim 1, wherein the central opening in the disk member is circular and receives an axle of the inserting member.

5. The clutch assembly according to claim 4, wherein the axle extends outwards from a top side and from a bottom side of a circular disk in the inserting member, and wherein a portion of the axle extending from the bottom side is received in the central opening of the disk member, and a portion of the axle extending from the top side being shaped to fit in a driven component.

6. A toy comprising the clutch assembly of claim 1.

7. A clutch assembly for a toy, comprising:
a clutch disk member having a central opening and a plurality of seats distributed in a circular pattern;
an inserting member having a plurality of wedges distributed in a circular pattern,
wherein the seats and the wedges are composed and dimensioned to (A) engage the wedges in the seats when a force exerted between a driving element operably connected to the clutch disk member and a driven element operably connected to the inserting member is less than a predetermined force level, and (B) automatically disengage the wedges from the seats when the force exerted exceeds the predetermined force level,
wherein the seats are arranged on a bottom surface of the disk member and the wedges are arranged on a top surface of the inserting member,
wherein at least one of the central opening in the disk member and a central opening in the inserting member is hexagon-shaped,
wherein the top surface of the inserting member includes an outer circular area and an inner circular area, wherein the outer circular area comprises the wedges and the inner circular area comprises a plurality of openings with elastic strips arranged between the openings, and wherein the elastic strips connect the outer circular area to the central opening in the inserting member.

8. The clutch assembly according to claim 7, wherein the seats and the wedges are radially elongated.

9. The clutch assembly according to claim 7, wherein the bottom surface of the disk member comprises a first circular strip comprising the seats and a second circular strip in between the first circular strip and the central opening, wherein the second circular strip does not include any of the seats.

10. A toy comprising the clutch assembly of claim 7.

11. A method of assembling a clutch assembly in a toy, the method comprising:
arranging a disk member having a central opening and a plurality of seats distributed in a circular pattern; and
arranging an inserting member having a plurality of wedges distributed in a circular pattern,
wherein the seats and the wedges are composed and dimensioned to (A) engage the wedges in the seats when a force exerted between a driving element operably connected to the disk member and a driven element operably connected to the inserting member is less than a predetermined force level, and (B) automatically disengage the wedges from the seats when the force exerted exceeds the predetermined force level, and (C) re-engage again when the excessive force is released so as to fall below the pre-determined force level after slippage of the wedges out of the seats,
wherein the seats are arranged facing inside on a perimeter rim of the disk member, and the wedges are arranged on a perimeter rim of the inserting member facing outward,
wherein the inserting member includes a plurality of openings distributed in a circular strip between the perimeter and the central opening, and
wherein a plurality of elastic strips separate respective ones of the openings.

* * * * *